United States Patent
Purohit et al.

(10) Patent No.: US 12,437,608 B2
(45) Date of Patent: *Oct. 7, 2025

(54) SECURELY STORING MACHINE DATA ON A NON-VOLATILE MEMORY DEVICE

(71) Applicant: Aristocrat Technologies, Inc., Las Vegas, NV (US)

(72) Inventors: Nimish Purohit, Las Vegas, NV (US); Tyson Adams, Henderson, NV (US); Rex Carlson, Henderson, NV (US); Garrett Hill, Las Vegas, NV (US); Rajendrasinh Jadeja, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 190 days.

This patent is subject to a terminal disclaimer.

(21) Appl. No.: 18/357,660

(22) Filed: Jul. 24, 2023

(65) Prior Publication Data

US 2023/0368608 A1 Nov. 16, 2023

Related U.S. Application Data

(63) Continuation of application No. 17/671,388, filed on Feb. 14, 2022, now Pat. No. 11,756,375, which is a (Continued)

(51) Int. Cl.
*G07F 17/32* (2006.01)
*G06F 16/23* (2019.01)
(Continued)

(52) U.S. Cl.
CPC ...... *G07F 17/3223* (2013.01); *G06F 16/2379* (2019.01); *G06F 16/27* (2019.01);
(Continued)

(58) Field of Classification Search
CPC ............. G07F 17/3223; G07F 17/3216; G07F 17/3227; G07F 17/3251; G07F 17/3213;
(Continued)

(56) References Cited

U.S. PATENT DOCUMENTS

| 39,370 A | 8/1863 | Alexander |
| 4,582,324 A | 4/1986 | Koza |

(Continued)

FOREIGN PATENT DOCUMENTS

| AU | 2019203135 A1 | 12/2019 |
| GB | 2573622 A | 4/2019 |

(Continued)

OTHER PUBLICATIONS

Australian Examination Report No. 1 issued in App. No. AU2023201845, daated Jun. 12, 2024, 4 pages.
(Continued)

*Primary Examiner* — Kevin Y Kim
(74) *Attorney, Agent, or Firm* — Armstrong Teasdale LLP

(57) ABSTRACT

An electronic gaming machine (EGM) includes a cabinet, a wireless transmitter, a memory device storing a unique device identifier (ID) of the EGM, and a game controller. The game controller is configured to execute a first node of a blockchain network on the EGM and store a first copy of the blockchain on a first memory partition, execute a second node of the blockchain network on the EGM and store a second copy of the blockchain on a second memory partition, generate a metering event associated with game play, submit a first blockchain transaction to the blockchain network, causing the first blockchain transaction to be added to a new block on the blockchain, and locally determine consensus for the new block on the blockchain between the first node and the second node of the EGM.

20 Claims, 6 Drawing Sheets

Related U.S. Application Data continuation of application No. 16/864,800, filed on May 1, 2020, now Pat. No. 11,263,866.

(60) Provisional application No. 62/855,630, filed on May 31, 2019.

(51) Int. Cl.
  *G06F 16/27* (2019.01)
  *G07F 17/34* (2006.01)

(52) U.S. Cl.
  CPC ...... *G07F 17/3216* (2013.01); *G07F 17/3227* (2013.01); *G07F 17/3251* (2013.01); *G07F 17/3213* (2013.01); *G07F 17/3239* (2013.01); *G07F 17/3267* (2013.01); *G07F 17/34* (2013.01)

(58) Field of Classification Search
  CPC .. G07F 17/3239; G07F 17/3267; G07F 17/34; G06F 16/2379; G06F 16/27
  See application file for complete search history.

(56) References Cited

U.S. PATENT DOCUMENTS

| | | |
|---|---|---|
| 5,283,422 A | 2/1994 | Storch |
| 5,326,104 A | 7/1994 | Pease |
| 5,605,334 A | 2/1997 | McCrea, Jr. |
| 5,611,730 A | 3/1997 | Weiss |
| 5,643,086 A | 7/1997 | Alcorn |
| 5,735,742 A | 4/1998 | French |
| 5,970,143 A | 10/1999 | Schneier |
| 6,154,131 A | 11/2000 | Jones, II |
| 6,165,069 A | 12/2000 | Sines |
| 6,383,076 B1 | 5/2002 | Tiedeken |
| 6,460,848 B1 | 10/2002 | Soltys |
| 6,488,585 B1 | 12/2002 | Wells |
| 6,641,484 B2 | 11/2003 | Oles |
| 7,003,139 B2 | 2/2006 | Endrikhovski |
| 7,154,380 B1 | 12/2006 | Tarrab, Jr. |
| 7,168,089 B2 | 1/2007 | Nguyen |
| 7,316,615 B2 | 1/2008 | Soltys |
| 7,581,256 B2 | 8/2009 | Cockerille |
| 7,708,638 B2 | 5/2010 | Enzminger |
| 7,736,234 B2 | 6/2010 | Cockerille |
| 7,815,507 B2 | 10/2010 | Parrott |
| 7,951,003 B2 | 5/2011 | Russell |
| 8,157,647 B2 | 4/2012 | House |
| 8,303,417 B2 | 11/2012 | Burke |
| 8,366,542 B2 | 2/2013 | White |
| 8,407,147 B2 | 3/2013 | Lenger |
| 8,449,378 B2 | 5/2013 | Michaelson |
| 8,608,568 B2 | 12/2013 | Carpenter |
| 8,628,413 B2 | 1/2014 | Lemay |
| 8,657,674 B2 | 2/2014 | Lemay |
| 8,777,758 B2 | 7/2014 | Anderson |
| 8,801,517 B2 | 8/2014 | Walker |
| 8,917,971 B2 | 12/2014 | Woods |
| 8,944,910 B1 | 2/2015 | Boyle |
| 8,974,304 B2 | 3/2015 | Gagner |
| 9,033,791 B2 | 5/2015 | Hamlin |
| 9,084,937 B2 | 7/2015 | Gadher |
| 9,117,329 B2 | 8/2015 | Osgood |
| 9,117,339 B2 | 8/2015 | Burke |
| 9,269,216 B2 | 2/2016 | Keilwert |
| 9,325,203 B2 | 4/2016 | Nguyen |
| 9,367,991 B2 | 6/2016 | Acres |
| 9,616,324 B2 | 4/2017 | Krenn |
| 9,865,139 B2 | 1/2018 | Walker |
| 10,037,648 B2 | 7/2018 | Acres |
| 10,223,679 B2 | 3/2019 | Lee |
| 10,229,561 B2 | 3/2019 | Cage |
| 10,275,583 B2 | 4/2019 | Leuthardt |
| 10,297,106 B1 | 5/2019 | Simons |
| 10,322,727 B1 | 6/2019 | Chan |
| 10,425,426 B1 | 9/2019 | Simons |
| 10,497,204 B2 | 12/2019 | Weber |
| 10,530,569 B2 | 1/2020 | Bisti |
| 10,549,202 B2 | 2/2020 | Mccoy |
| 10,706,678 B2 | 7/2020 | Nguyen |
| 10,741,017 B2 | 8/2020 | Silva |
| 10,850,204 B2 | 12/2020 | Bruzzo |
| 10,943,438 B2 | 3/2021 | Cage |
| 10,949,417 B2 | 3/2021 | Kurian |
| 10,950,081 B2 | 3/2021 | Baker |
| 10,991,201 B2 | 4/2021 | Mcdowell |
| 11,004,304 B2 | 5/2021 | Nguyen |
| 11,023,981 B2 | 6/2021 | Hu |
| 11,045,726 B2 | 6/2021 | Hennessy |
| 11,107,321 B2 | 8/2021 | Ovalle |
| 11,158,170 B2 | 10/2021 | Thomas |
| 11,159,334 B2 | 10/2021 | Kuzma |
| 11,159,945 B2 | 10/2021 | Obaidi |
| 11,189,130 B2 | 11/2021 | Purohit |
| 11,195,371 B2 | 12/2021 | Purohit |
| 11,232,442 B2 | 1/2022 | Liu |
| 11,245,529 B2 | 2/2022 | Clark |
| 11,281,644 B2 | 3/2022 | Shimamura |
| 11,288,921 B2 | 3/2022 | Haishima |
| 11,308,761 B2 | 4/2022 | Purohit |
| 11,373,446 B1 | 6/2022 | Beisel |
| 11,373,480 B2 | 6/2022 | Taylor |
| 11,380,070 B2 | 7/2022 | Koidahl |
| 11,651,651 B2 | 5/2023 | Nimish |
| 11,688,233 B2 | 6/2023 | Acres |
| 11,783,669 B2 | 10/2023 | Schwartz |
| 2001/0019966 A1 | 9/2001 | Idaka |
| 2002/0025850 A1 | 2/2002 | Hafezi |
| 2002/0032051 A1 | 3/2002 | Stockdale |
| 2002/0142831 A1 | 10/2002 | Mattice |
| 2002/0152120 A1 | 10/2002 | Howington |
| 2003/0032485 A1 | 2/2003 | Cockerille |
| 2003/0041085 A1 | 2/2003 | Sato |
| 2003/0060283 A1 | 3/2003 | Rowe |
| 2004/0048669 A1 | 3/2004 | Rowe |
| 2004/0127277 A1 | 7/2004 | Walker |
| 2004/0235562 A1 | 11/2004 | Kiely |
| 2005/0043086 A1 | 2/2005 | Schneider |
| 2005/0130728 A1 | 6/2005 | Nguyen |
| 2006/0035713 A1 | 2/2006 | Cockerille |
| 2006/0063595 A1 | 3/2006 | Kondo |
| 2006/0100009 A1 | 5/2006 | Walker |
| 2006/0111172 A1 | 5/2006 | Walker |
| 2006/0166732 A1 | 7/2006 | Lechner |
| 2006/0189382 A1 | 8/2006 | Muir |
| 2006/0205488 A1 | 9/2006 | Gagner |
| 2006/0264253 A1 | 11/2006 | Trobia |
| 2006/0281541 A1 | 12/2006 | Nguyen |
| 2007/0054734 A1 | 3/2007 | Morrow |
| 2007/0276521 A1 | 11/2007 | Harris |
| 2008/0058059 A1 | 3/2008 | Fitzsimons |
| 2008/0167118 A1 | 7/2008 | Kroeckel |
| 2008/0182667 A1 | 7/2008 | Davis |
| 2008/0207319 A1 | 8/2008 | Okada |
| 2008/0214300 A1 | 9/2008 | Williams |
| 2008/0235746 A1 | 9/2008 | Peters |
| 2009/0042640 A1 | 2/2009 | Gagner |
| 2009/0061987 A1 | 3/2009 | Canterbury |
| 2009/0111583 A1 | 4/2009 | Zalewski |
| 2009/0124392 A1 | 5/2009 | Ruppert |
| 2009/0181720 A1 | 7/2009 | Marsico |
| 2009/0197660 A1 | 8/2009 | Cramer |
| 2009/0247293 A1 | 10/2009 | Lenger |
| 2010/0093428 A1 | 4/2010 | Mattice |
| 2010/0203961 A1 | 8/2010 | Burke |
| 2010/0234094 A1 | 9/2010 | Gagner |
| 2010/0248812 A1 | 9/2010 | Pacey |
| 2010/0255902 A1 | 10/2010 | Goldstein |
| 2010/0291994 A1 | 11/2010 | Denham |
| 2011/0089730 A1 | 4/2011 | Higgs |
| 2011/0102546 A1 | 5/2011 | Dhuse |
| 2011/0109134 A1 | 5/2011 | Filipour |
| 2011/0111838 A1 | 5/2011 | Bauer |

(56) References Cited

U.S. PATENT DOCUMENTS

| | | |
|---|---|---|
| 2011/0117984 A1 | 5/2011 | Shimabukuro |
| 2011/0124405 A1 | 5/2011 | Okada |
| 2011/0195789 A1 | 8/2011 | Wells |
| 2012/0021824 A1 | 1/2012 | Wells |
| 2012/0028703 A1 | 2/2012 | Anderson |
| 2012/0035751 A1 | 2/2012 | Dimitriadis |
| 2012/0100908 A1 | 4/2012 | Wells |
| 2012/0129596 A1 | 5/2012 | Thackston |
| 2012/0193956 A1 | 8/2012 | Baker |
| 2012/0229508 A1 | 9/2012 | Wigdor |
| 2012/0322564 A1 | 12/2012 | Granger |
| 2013/0065669 A1 | 3/2013 | Michaelson |
| 2013/0065670 A1 | 3/2013 | Michaelson |
| 2013/0072304 A1 | 3/2013 | Brosnan |
| 2013/0084959 A1 | 4/2013 | Nelson |
| 2013/0084960 A1 | 4/2013 | Frady |
| 2013/0084973 A1 | 4/2013 | Frady |
| 2013/0085001 A1 | 4/2013 | Anderson |
| 2013/0137498 A1 | 5/2013 | Willyard |
| 2013/0190095 A1 | 7/2013 | Gadher |
| 2013/0196755 A1 | 8/2013 | Nelson |
| 2014/0219492 A1 | 8/2014 | Pelliccio |
| 2014/0235324 A1 | 8/2014 | Ryan |
| 2014/0256450 A1 | 9/2014 | Bleich |
| 2014/0274255 A1 | 9/2014 | Walkingstick |
| 2014/0274309 A1 | 9/2014 | Nguyen |
| 2014/0323194 A1 | 10/2014 | Keilwert |
| 2014/0324749 A1 | 10/2014 | Peters |
| 2015/0279155 A1 | 10/2015 | Chun |
| 2015/0302690 A1 | 10/2015 | Hutchinson-Kay |
| 2016/0012465 A1 | 1/2016 | Sharp |
| 2016/0023116 A1 | 1/2016 | Wire |
| 2016/0093144 A1 | 3/2016 | Kitamura |
| 2016/0292558 A1 | 10/2016 | Daniel |
| 2016/0335840 A1 | 11/2016 | Acres |
| 2017/0061731 A1 | 3/2017 | Colvin |
| 2017/0161991 A1 | 6/2017 | Ayati |
| 2017/0278304 A1 | 9/2017 | Hildreth |
| 2017/0287593 A1 | 10/2017 | Ovalle |
| 2017/0293669 A1 | 10/2017 | Madhavan |
| 2017/0300876 A1 | 10/2017 | Musiala, Jr. |
| 2017/0316644 A1 | 11/2017 | Arnone |
| 2018/0019867 A1 | 1/2018 | Davis |
| 2018/0039942 A1 | 2/2018 | Rogers |
| 2018/0089956 A1 | 3/2018 | Nagaragatta |
| 2018/0096175 A1 | 4/2018 | Schmeling |
| 2018/0096752 A1 | 4/2018 | Ovalle |
| 2018/0114403 A1 | 4/2018 | Jayachandran |
| 2018/0117446 A1 | 5/2018 | Tran |
| 2018/0225640 A1 | 8/2018 | Chapman |
| 2018/0247191 A1 | 8/2018 | Katz |
| 2018/0293834 A1 | 10/2018 | Cage |
| 2018/0370476 A1 | 12/2018 | Alequin |
| 2019/0028264 A1 | 1/2019 | Bisti |
| 2019/0028265 A1 | 1/2019 | Bisti |
| 2019/0066488 A1 | 2/2019 | Locke |
| 2019/0080554 A1 | 3/2019 | Barbour |
| 2019/0096170 A1 | 3/2019 | Lewis |
| 2019/0096191 A1 | 3/2019 | Stuehling |
| 2019/0102986 A1 | 4/2019 | Nelson |
| 2019/0109714 A1 | 4/2019 | Clark |
| 2019/0122300 A1 | 4/2019 | O'Brien |
| 2019/0122492 A1 | 4/2019 | Nguyen |
| 2019/0122495 A1 | 4/2019 | Yi |
| 2019/0130698 A1 | 5/2019 | Simons |
| 2019/0130701 A1 | 5/2019 | Simons |
| 2019/0143207 A1 | 5/2019 | Kumar |
| 2019/0149418 A1 | 5/2019 | Bertsche |
| 2019/0163672 A1 | 5/2019 | Shmueli |
| 2019/0180558 A1 | 6/2019 | Merati |
| 2019/0188653 A1 | 6/2019 | Khaund |
| 2019/0205894 A1 | 7/2019 | Gonzales, Jr. |
| 2019/0221076 A1 | 7/2019 | Simons |
| 2019/0280875 A1 | 9/2019 | Ragnoni |
| 2019/0289019 A1 | 9/2019 | Thekadath |
| 2019/0295371 A1 | 9/2019 | Simons |
| 2019/0296915 A1 | 9/2019 | Lancashire |
| 2019/0314726 A1 | 10/2019 | Masini |
| 2019/0321722 A1 | 10/2019 | Hennessy |
| 2019/0325700 A1 | 10/2019 | Jayachandran |
| 2019/0333285 A1 | 10/2019 | Delia |
| 2019/0352125 A1 | 11/2019 | Wooten |
| 2019/0355209 A1 | 11/2019 | Sorey |
| 2019/0373015 A1 | 12/2019 | Kozloski |
| 2020/0020194 A1 | 1/2020 | Higgins |
| 2020/0021600 A1 | 1/2020 | Simons |
| 2020/0027315 A1 | 1/2020 | Cotton |
| 2020/0051081 A1 | 2/2020 | Valecha |
| 2020/0051368 A1 | 2/2020 | Pustizzi |
| 2020/0066093 A1 | 2/2020 | Schwartz |
| 2020/0090463 A1 | 3/2020 | Mohrhardt |
| 2020/0097862 A1 | 3/2020 | Arora |
| 2020/0105096 A1 | 4/2020 | Ovalle |
| 2020/0110855 A1 | 4/2020 | Cunningham |
| 2020/0145217 A1 | 5/2020 | Clark |
| 2020/0152005 A1 | 5/2020 | Higgins |
| 2020/0168036 A1 | 5/2020 | Schwartz |
| 2020/0168038 A1 | 5/2020 | Schwartz |
| 2020/0168041 A1 | 5/2020 | Schwartz |
| 2020/0189420 A1 | 6/2020 | Urano |
| 2020/0193764 A1 | 6/2020 | Ovalle |
| 2020/0202668 A1 | 6/2020 | Cotta |
| 2020/0211325 A1 | 7/2020 | Kaizerman |
| 2020/0380817 A1 | 12/2020 | Purohit |
| 2020/0410433 A1 | 12/2020 | Rahilly |
| 2020/0412813 A1 | 12/2020 | Mong |
| 2021/0037013 A1 | 2/2021 | Salkintzis |
| 2021/0174634 A1 | 6/2021 | Purohit |
| 2021/0233351 A1 | 7/2021 | Meltzer |
| 2021/0241566 A1 | 8/2021 | Russ |
| 2021/0327208 A1 | 10/2021 | Colvin |
| 2021/0335085 A1 | 10/2021 | Froy, Jr. |
| 2021/0350659 A1 | 11/2021 | Purohit |
| 2022/0006831 A1 | 1/2022 | Garg |
| 2022/0030000 A1 | 1/2022 | Lee |
| 2022/0038280 A1 | 2/2022 | Punal |
| 2022/0207959 A1 | 6/2022 | Schwartz |
| 2022/0215719 A1 | 7/2022 | Schwartz |
| 2022/0383695 A1 | 12/2022 | Demarco |
| 2023/0130583 A1 | 4/2023 | Shaffer, Jr. |
| 2023/0306816 A1 | 9/2023 | Nimish |
| 2023/0419778 A1 | 12/2023 | Schwartz |

FOREIGN PATENT DOCUMENTS

| | | |
|---|---|---|
| WO | 2018060951 A1 | 4/2018 |
| WO | 2019089774 A1 | 5/2019 |
| WO | 2019089778 A1 | 5/2019 |

OTHER PUBLICATIONS

Office Action (Non-Final Rejection) dated Jun. 18, 2024 for U.S. Appl. No. 17/857,988 (pp. 1-18).

Office Action (Notice of Allowance and Fees Due (PTOL-85)) dated Jul. 9, 2024 for U.S. Appl. No. 17/858,769 (pp. 1-8).

Office Action (Notice of Allowance and Fees Due (PTOL-85)) dated Jul. 16, 2024 for U.S. Appl. No. 18/351,965 (pp. 1-8).

Office Action (Notice of Allowance and Fees Due (PTOL-85)) dated Jul. 16, 2024 for U.S. Appl. No. 18/351,962 (pp. 1-8).

Office Action (Non-Final Rejection) dated Jul. 29, 2024 for U.S. Appl. No. 17/709,146 (pp. 1-7).

Office Action (Notice of Allowance and Fees Due (PTOL-85)) dated Aug. 14, 2024 for U.S. Appl. No. 17/858,769 (pp. 1-2).

Office Action (Non-Final Rejection) dated Dec. 6, 2023 for U.S. Appl. No. 17/844,466 (pp. 1-7).

Office Action (Notice of Allowance and Fees Due (PTOL-85)) dated Feb. 22, 2024 for U.S. Appl. No. 17/705,010 (pp. 1-9).

Office Action (Non-Final Rejection) dated Mar. 7, 2024 for U.S. Appl. No. 18/351,965 (pp. 1-38).

Office Action (Non-Final Rejection) dated Mar. 7, 2024 for U.S. Appl. No. 18/351,962 (pp. 1-38).

(56) References Cited

OTHER PUBLICATIONS

Office Action dated Mar. 19, 2024 for U.S. Appl. No. 18/191,693 (pp. 1-17).
Notice of Allowance dated Mar. 22, 2024 for U.S. Appl. No. 17/858,769 (pp. 1-9).
Notice of Allowance dated Apr. 16, 2024 for U.S. Appl. No. 17/844,466 (pp. 1-5)
Office Action (Notice of Allowance and Fees Due (PTOL-85)) dated Apr. 16, 2024 for U.S. Appl. No. 17/844,466 (pp. 1-5).
Office Action (Non-Final Rejection) dated Sep. 6, 2024 for U.S. Appl. No. 18/302,542 (pp. 1-5).
Office Action (Final Rejection) dated Sep. 23, 2024 for U.S. Appl. No. 18/191,693 (pp. 1-10).
Office Action (Non-Final Rejection) dated Sep. 25, 2024 for U.S. Appl. No. 18/461,233 (pp. 1-11).
Office Action (Notice of Allowance and Fees Due (PTOL-85)) dated Nov. 8, 2024 for U.S. Appl. No. 17/709,146 (pp. 1-8).
Office Action (Notice of Allowance and Fees Due (PTOL-85)) dated Nov. 27, 2024 for U.S. Appl. No. 18/302,542 (pp. 1-5).
Office Action (Final Rejection) dated Nov. 25, 2024 for U.S. Appl. No. 17/857,988 (pp. 1-22).
Office Action (Notice of Allowance and Fees Due (PTOL-85)) dated Dec. 13, 2024 for U.S. Appl. No. 18/364,231 (pp. 1-5).
Brendan Koerner, "Russians Engineer A Brilliant Slot Machine Cheat—And Casinos Have No Fix", https://www.wired.com/2017/02/russians-engineer-brilliant-slot-machine-cheat-casinos-no-fix/, Nov. 6, 2018, 14 pages.
Brendan Koerner, "Meet Alex, The Russian Casino Hacker Who Makes Millions Targeting Slot Machines", https://Wired.com/story/meet-alex-the-russian-casino-hacker-who-makes-millions-targeting-slot-machines/, Nov. 6, 2018, 18 pages.
Office Action dated Mar. 8, 2021 for U.S. Appl. No. 16/415,654 (pp. 1-12).
Office Action (Notice of Allowance and Fees Due (PTOL-85)) dated Nov. 26, 2021 for U.S. Appl. No. 16/778,743 (pp. 1-9).
Office Action (Notice of Allowance and Fees Due (PTOL-85)) dated Aug. 25, 2021 for U.S. Appl. No. 16/415,654 (pp. 1-10).
Office Action (Notice of Allowance and Fees Due (PTOL-85)) dated Oct. 6, 2021 for U.S. Appl. No. 16/864,800 (pp. 1-9).
Office Action (Notice of Allowance and Fees Due (PTOL-85)) dated Dec. 8, 2021 for U.S. Appl. No. 16/778,768 (pp. 1-8).
Office Action (Notice of Allowance and Fees Due (PTOL-85)) dated Dec. 21, 2021 for U.S. Appl. No. 16/837,655 (pp. 1-8).
Office Action (Notice of Allowance and Fees Due (PTOL-85)) dated Dec. 23, 2021 for U.S. Appl. No. 16/778,841 (pp. 1-9).
Office Action (Notice of Allowance and Fees Due (PTOL-85)) dated Feb. 8, 2022 for U.S. Appl. No. 16/778,987 (pp. 1-8).
Office Action (Notice of Allowance and Fees Due (PTOL-85)) dated Jan. 13, 2022 for U.S. Appl. No. 16/864,800 (pp. 1-7).
Office Action (Notice of Allowance and Fees Due (PTOL-85)) dated Jan. 14, 2022 for U.S. Appl. No. 16/778,923 (pp. 1-8).
Office Action (Notice of Allowance and Fees Due (PTOL-85)) dated Aug. 11, 2021 for U.S. Appl. No. 16/902,186 (pp. 1-8).
Office Action (Notice of Allowance and Fees Due (PTOL-85)) dated Feb. 2, 2022 for U.S. Appl. No. 16/778,889 (pp. 1-8).
Office Action (Non-Final Rejection) dated Feb. 1, 2022 for U.S. Appl. No. 17/222,763 (pp. 1-9).
Office Action (Notice of Allowance and Fees Due (PTOL-85)) dated Mar. 9, 2022 for U.S. Appl. No. 16/841,957 (pp. 1-9).
Office Action (Final Rejection) dated May 13, 2022 for U.S. Appl. No. 17/222,763 (pp. 1-11).
Office Action (Non-Final Rejection) dated Aug. 30, 2022 for U.S. Appl. No. 17/222,763 (pp. 1-11).
Office Action (Notice of Allowance and Fees Due (PTOL-85)) dated Jan. 5, 2023 for U.S. Appl. No. 17/222,763 (pp. 1-7).
Office Action (Non-Final Rejection) dated Jan. 18, 2023 for U.S. Appl. No. 17/671,388 (pp. 1-6).
Office Action (Notice of Allowance and Fees Due (PTOL-85)) dated Feb. 10, 2023 for U.S. Appl. No. 17/721,152 (pp. 1-10).
Office Action (Non-Final Rejection) dated Mar. 16, 2023 for U.S. Appl. No. 17/529,050 (pp. 1-13).
Office Action (Non-Final Rejection) dated Mar. 16, 2023 for U.S. Appl. No. 17/529,069 (pp. 1-13).
Office Action (Non-Final Rejection) dated Apr. 12, 2023 for U.S. Appl. No. 17/543,339 (pp. 1-5).
Office Action (Notice of Allowance and Fees Due (PTOL-85)) dated Apr. 14, 2023 for U.S. Appl. No. 17/529,069 (pp. 1-9).
Notice of Allowance dated Apr. 14, 2023 for U.S. Appl. No. 17/529,050 (pp. 1-9).
Office Action (Notice of Allowance and Fees Due (PTOL-85)) dated Apr. 26, 2023 for U.S. Appl. No. 17/671,388 (pp. 1-9).
Office Action (Notice of Allowance and Fees Due (PTOL-85)) dated May 10, 2023 for U.S. Appl. No. 17/543,339 (pp. 1-5).
Office Action (Notice of Allowance and Fees Due (PTOL-85)) dated Jun. 7, 2023 for U.S. Appl. No. 17/697,637 (pp. 1-9).
Australian Examination Report No. 1 issued in App. No. AU2019219795, dated Oct. 16, 2023, 4 pages.
Australian Examination Report No. 1 issued in App. No. AU2020203526 dated Feb. 17, 2025, 9 pages.
Australian Examination Report No. 1 issued in App. No. AU2020203525, dated Feb. 3, 2025, 10 pages.
Australian Examination Report No. 1 issued App. No. AU2020200107, dated Mar. 19, 2025, 6 pages.
Australian Examination Report No. 1 issued in App. No. 2020203579 dated Mar. 26, 2025, 6 pages.
Australian Examination Report No. 2 issued in App. No. AU2023201845 dated Jun. 2, 2025, 4 pages.

SECURELY STORING MACHINE DATA ON A NON-VOLATILE MEMORY DEVICE

CROSS-REFERENCE TO RELATED APPLICATIONS

This application is a continuation of and claims priority to U.S. patent application Ser. No. 17/671,388, filed Feb. 14, 2022, which is a continuation of U.S. patent application Ser. No. 16/864,800, now U.S. Pat. No. 11,263,866, filed May 1, 2020, which claims the benefit priority of U.S. Provisional Patent Application No. 62/855,630, filed May 31, 2019, all of which are hereby incorporated by reference in their entireties.

TECHNICAL FIELD

The field of disclosure relates generally to data storage, and more particularly to storing data on a nonvolatile memory device of an electronic gaming machine.

BACKGROUND

Many known computing devices require a variety of data at startup (e.g., to initiate and complete a boot sequence and/or to perform a variety of other startup and initialization operations). In addition, at least some known computing devices may not permanently or persistently store such initializing and startup data. For example, many conventional electronic gaming machines (or EGMs) may require a variety of data to initialize the EGM but may not store such data. Additionally, many known EGMs include a metal plate (sometimes called a "license plate") stamped with certain EGM-specific information, such as an EGM serial number, an EGM manufacturer, and the like.

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance. When the player is done, he/she cashes out the credit balance (typically by pressing a cash out button to receive a ticket from the ticket printer). The ticket may be "cashed-in" for money or inserted into another machine to establish a credit balance for play by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix." Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "paytable" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

As described above, in at least some known electronic gaming machines, the EGM includes a "license plate," also known as a "serial number plate," stamped with certain EGM-specific information, such as an EGM serial number, an EGM manufacturer, and other identifying information. The license plate is usually attached to an exterior surface of the EGM (e.g., an exterior cabinet surface), where it is visible, on close inspection, to a casino operator or technician. However, in a dimly lit casino environment, the license plate may be difficult to observe visually. This problem is frequently exacerbated by placement of EGM license plates on hard-to-reach portions of an EGM, such as rear surfaces positioned against a wall or on the side of the EGM which may be hard to see when two EGMs are placed next to each other.

In addition to the problems associated with conventional physical license plates, EGM configurations are traditionally monitored and logged using a handwritten log book or ledger stored within a cabinet of the EGM and manually updated each time the EGM is accessed or reconfigured in the field. Like a physical license plate, these logging procedures place log books, in many cases, in difficult to reach, locked, locations, and may also be difficult to read and update within a dimly lit casino environment. Further, use of the handwritten log book may be prone to human error, such as the service technician incorrectly entering information (e.g., date, time, error condition, and so forth), illegibly writing entries, or participating in fraud.

BRIEF SUMMARY

In one aspect, an electronic gaming machine (EGM) is provided. The EGM includes a cabinet. The EGM also includes a wireless transmitter. The EGM further includes at least one memory device housed within the cabinet. The at least one memory device stores EGM data associated with the EGM. The EGM data includes at least a unique device identifier (ID) of the EGM. The EGM also includes a game controller communicatively coupled to the at least one memory device and the transmitter. The game controller is housed within the cabinet. The game controller is configured to execute instructions stored on the at least one memory device, which when executed, cause the game controller to at least generate, at the EGM, a metering event associated with game play of an electronic game on the EGM. The metering event includes a transaction type and a transaction value. The instructions also cause the game controller to create a first blockchain transaction including at least the transaction type, the transaction value, and a timestamp. The instructions further cause the game controller to transmit the first blockchain transaction for storage in a blockchain.

In another aspect, a blockchain system is provided. The blockchain system includes an EGM, a system support server, and a reader device. The EGM includes a wireless beacon configured to broadcast a unique device identifier (ID) of the EGM. The reader device is configured to read the unique device ID of the EGM from the wireless beacon and transmit a scan event message to the system support server, including event data associated with the scan event. The system support server transmits the scan event message to the EGM and, upon receiving the scan event message from the system support server, the EGM creates a blockchain transaction for the scan event and transmits that blockchain transaction and associated scan event information to the blockchain, thereby memorializing the scan event in the blockchain.

BRIEF DESCRIPTION OF THE DRAWINGS

An example embodiment of the subject matter disclosed will now be described with reference to the accompanying drawings.

DETAILED DESCRIPTION

Example implementations described herein include a secure digital storage mechanism for EGM data, which may facilitate wireless transmission of EGM data from secure digital media enclosed within a cabinet of an EGM to a reader device disposed outside the cabinet and arranged to communicate with and receive the EGM data from a processor and transmitter also secured within the cabinet. The EGM data may, more particularly, be permanently or persistently stored in any of a variety of solid-state memories, hard disks, and/or redundant arrays, such that the EGM data is not easily deleted from the EGM, and such that the EGM data can be wirelessly and electronically obtained from an EGM without the necessity of manually reading data printed on a physical license plate of the EGM or within a log book of the EGM (such as a log book stored within a cabinet of the EGM and handwritten on when the EGM is accessed). Such actions may be imposed by internal controls, jurisdictional regulations, or the like.

In some embodiments, a metering blockchain system is provided. The EGMs participate in a peer-to-peer (P2P) network that uses decentralized ledger technology (e.g., blockchain) to provide aspects of decentralization, immutability, security, and transparency for data added to the blockchain. The EGM may transmit EGM data as transactions into the blockchain, thereby memorializing the data. The EGM data may be stored in the blockchain to capture snapshots of the EGM data in time, and processed on one or more participating backend or network devices (e.g., server systems) to perform a variety of EGM tracking and analysis activities. In some embodiments, the metering blockchain system is comprised of trusted nodes in a permissioned blockchain network. The metering blockchain provides no tokenization or rewards for mining, as there is no need to incentivize participation for the work contributed by the nodes. Further, the processing and energy consumption demands to nodes on the blockchain can be reduced by replacing the proof of work ("PoW") processing with other consensus mechanisms that dictate which node will add the next block to the blockchain, such as proof of stake ("PoS"), tangle, swirlds, delegated proof of stake, proof of selection, one or more delegated block generators, or the like.

Figure 1:
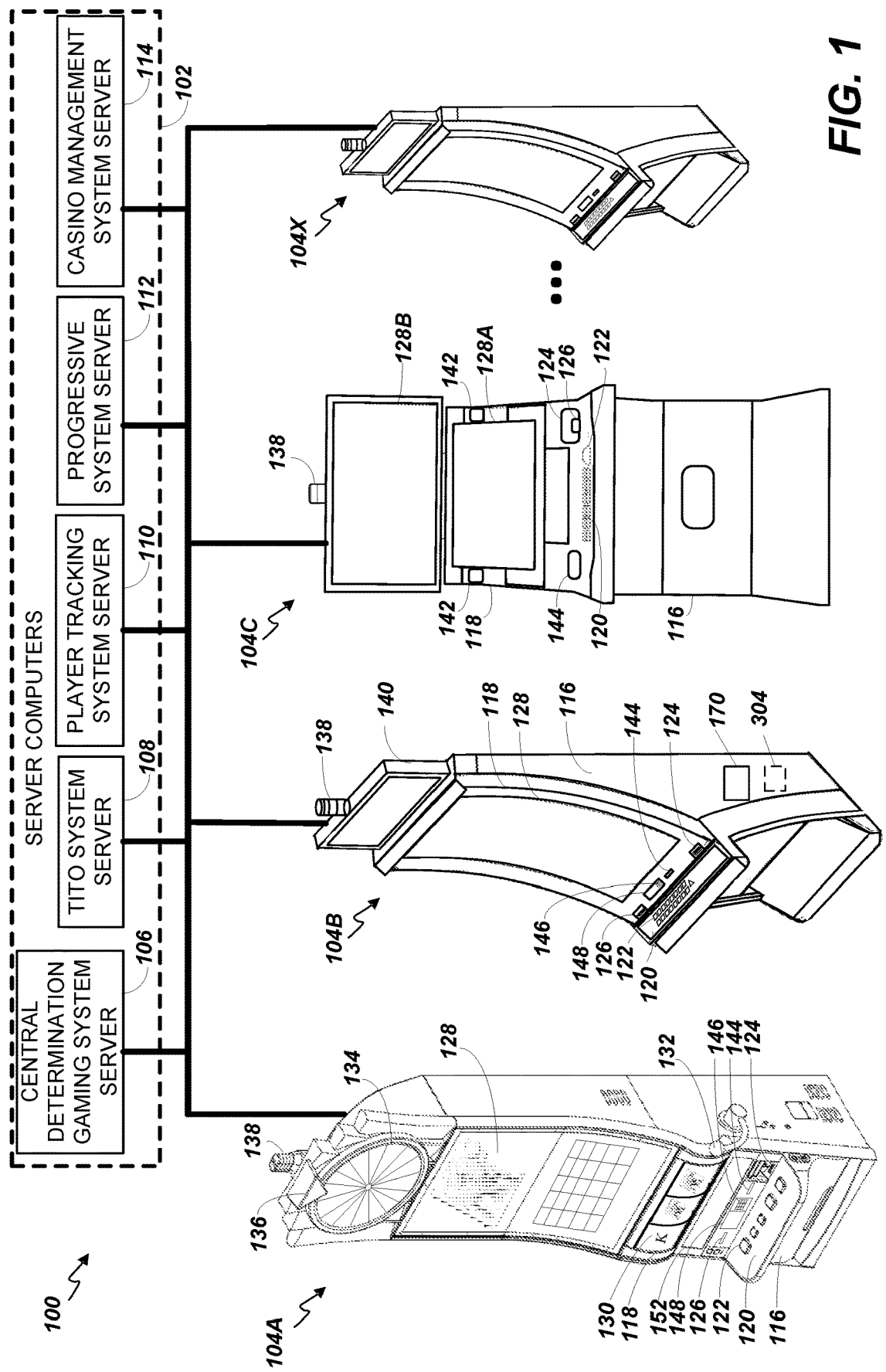
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Further, as shown, any of EGMs 104A-104X may, as described herein, include a license plate 170 such as a piece of plastic or sheet metal, stamped with certain EGM-specific information, such as an EGM serial number, an EGM manufacturer, and other identifying information. License plate 170 is usually attached to an exterior surface of an EGM, such as, for example, EGM 104B, (e.g., an exterior cabinet surface), where it is visible to a casino operator or technician. In some embodiments, the license plate 170 may include a machine-readable optical label (e.g., QR code, barcode, or the like) that embodies EGM-specific information. For example, the license plate 170 may be printed with a QR code that includes a unique device ID of the attached EGM (e.g., EGM serial number). As such, the optical label may be optically scanned and read to uniquely identify that particular EGM, and perhaps access data about that EGM (e.g., from a support server or the like).

In addition, as described in greater detail below, a memory device 304 may be included within an internal area of EGM 104A-104X, such as EGM 104B. As described below, memory device 304 may store a variety of EGM data, as described herein, related to an EGM 104A-104X, such as, for example, a variety of configuration data, log data, a serial number of an EGM 104A-104X, and the like. As described herein, a transmitter or transceiver 308 may also be included within the cabinet of an EGM 104A-104X.

Figure 2:
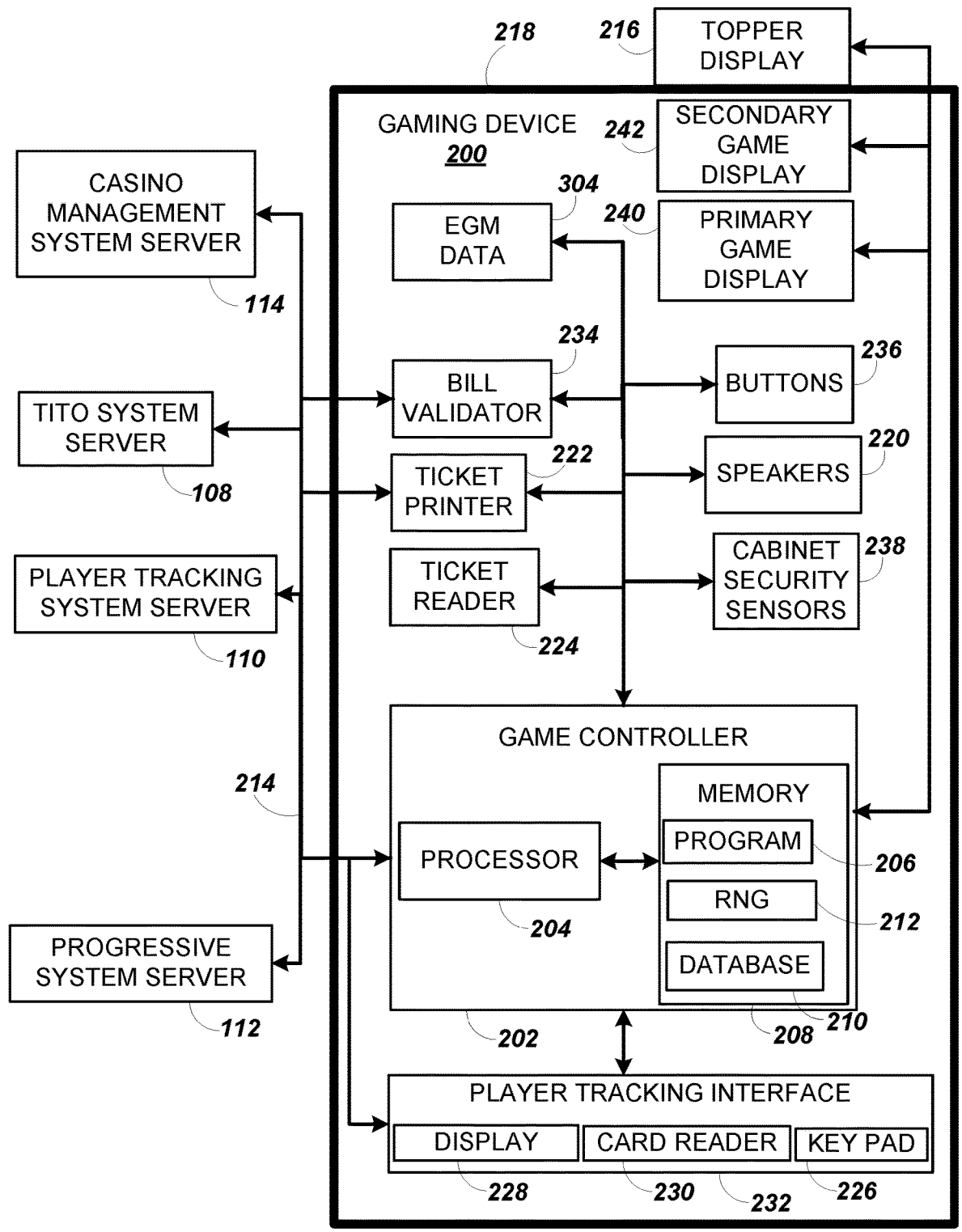
FIG. 2 is a block diagram showing various functional elements of an exemplary EGM as shown in FIG. 1.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that embodiments of the present disclosure represent an improvement in the art of secure data storage and transmission, particular in the highly regulated field of casino electronics and electronic gaming machine data retention and transmission. These embodiments are thus not merely new game rules or simply a new display pattern.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

As used herein, "EGM data" may refer to any information or data related to an EGM 104A-104X, such as, for example, any configuration data of an EGM 104A-104X, any log data, such as when and by whom an EGM 104A-104X was last accessed, a serial number (also referred to as a unique identifier or UID) of an EGM 104A-104X, meter data of an EGM 104A-104X (e.g., credit meter data), and/or more generally, any data which may be deemed relevant to or related in some way to an EGM 104A-104X.

Further, as used herein, "configuration data" may generally refer to any of a variety of startup or initialization data, such as setup data, parameters or data loaded or initialized at startup of an EGM, and the like. Further, as used herein, "log data" may generally refer to any data related to actions occurring on or in relation to an EGM 104A-104X during operation of the EGM 104A-104X, such as data indicating that a cabinet of an EGM 10A-104X was opened or closed, data indicating that a configuration parameter, such as a game title or denomination, was altered, reset, or changed, and the like.

EGM data may also include data related to one or more game titles stored on an EGM 104A-104X, MAC addresses of EGM hardware components, and/or any other data that is associated with an EGM 104A-104X in some way. Furthermore, EGM data, may, as described herein, be persistently or permanently stored in one or more memory devices of an EGM 104A-10X to track a provenance and history of an EGM 104A-104X, such as over the course of time as an EGM 104A-104X is moved from one location to another, including from one location within a single casino to another location within the casino or from one casino to a different casino.

Likewise, as described in additional detail below, EGM data may include meter data, such as, for example, cabinet meter and/or game meter data. Game meter data may include, for example, credit meter data, such as a credit balance of a player, a number of credits wagered by a player during a particular wagering game and/or during a particular round or session of a wagering game (e.g., during one or more spins of a plurality of reels), and the like. Game meter data may also, in at least some embodiments, include data associated with a jackpot, such as a progressive or stand-alone jackpot, where meter data may indicate a value of the jackpot or a plurality of jackpots, a player's wager contribution towards a jackpot or bonus game, and the like. Cabinet meter data may include, for example, any of a variety of meters or sensors of an EGM 104A-104X, such as meters or sensors used to detect and validate the authenticity of currency received from a player (e.g., an ultraviolet sensor used to verify currency), meters that detect and record opening and closing of a cabinet door, and the like. Meter data may also, in some embodiments, include a player's total number of accumulated or earned loyalty points, a subset of a player's loyalty points, a number of loyalty points earned or accumulated during a particular wagering game or session of the wagering game, and the like.

Figure 3:
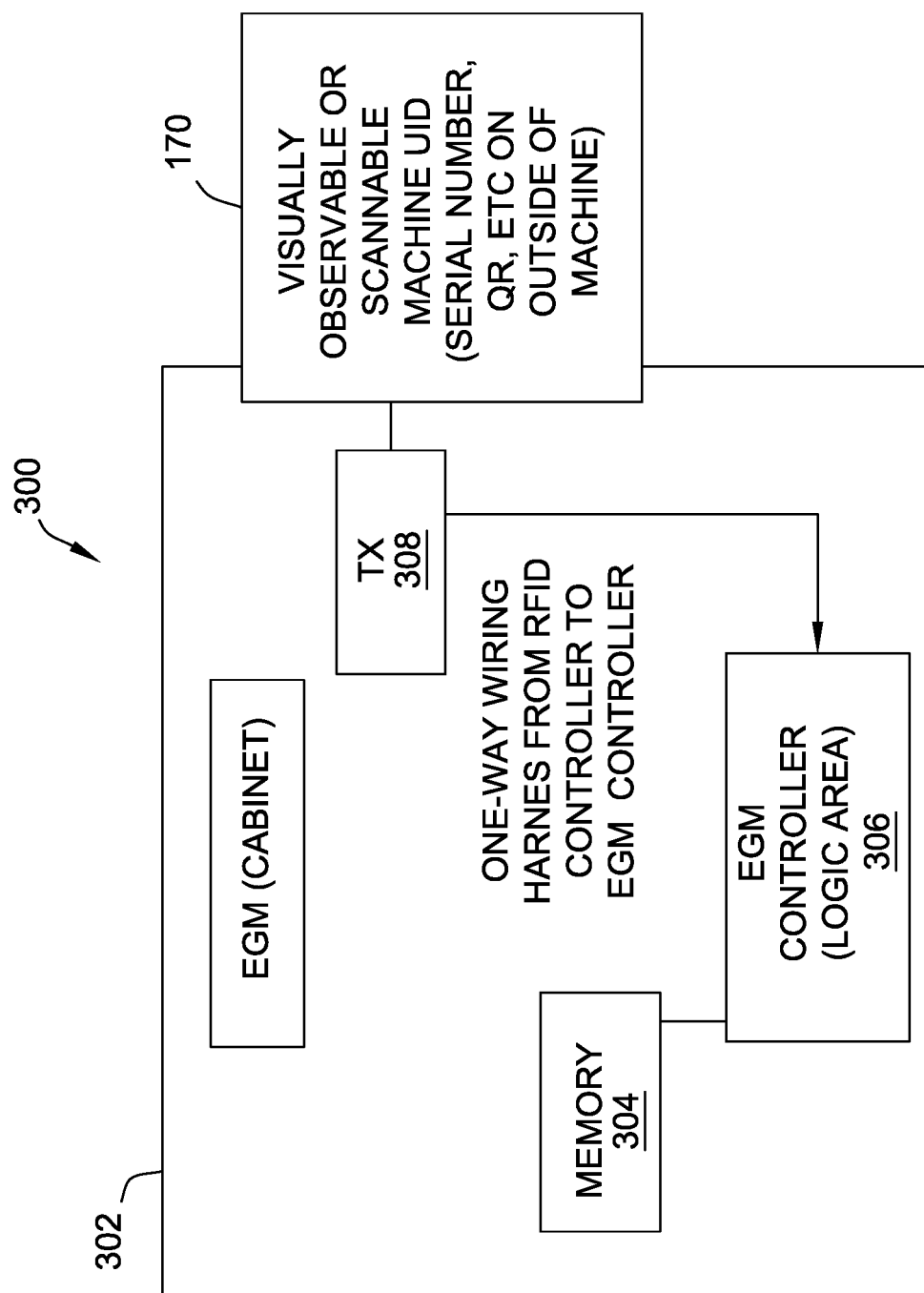
FIG. 3 is a block diagram of a system for permanently storing EGM data within a cabinet of an EGM.

FIG. 3 is a block diagram of a system 300 for persistently, or permanently, storing EGM data within a cabinet 302 of an EGM 104A-104X. In an example embodiment, system 300 includes a memory device 304, an EGM controller or processor 306, and a transmitter 308. As described herein, EGM controller or processor 306 may include a standalone computer processor or may be included in or comprise game controller 202, as shown with reference to FIG. 2.

Memory device 304 may include any suitable memory device, or collection of memory devices, such as, for example, any solid-state memory device(s) or hard disk drive(s). For instance, memory device 304 may include any nonvolatile memory (or NVM), such as nonvolatile random access memory (NVRAM) (e.g., one or more CompactFlash (CF) memory cards, flash drives, and/or other solid-state mass storage devices), and/or any other suitable nonvolatile and/or volatile memory. In some embodiments, memory device 304 includes an array of memory devices, such as an array of hard disks, configured to mirror or replicate all or a portion of data across a plurality of disks, disk sectors, or disk partitions, such as a plurality of memory devices arranged in a redundant array (e.g., a so-called redundant array of independent disks (RAID) array). Where a RAID array is implemented, any suitable RAID level architecture may be implemented, such as any of RAID level 0 through RAID level 10. In some embodiments, cabinet 302 includes a scratch partition that represents a persistent memory storage location (e.g., separate physical storage or part of the same physical storage) that permanently stores all EGM data through memory clear or reset events (e.g., factory reset, "RAM clear" process, or the like). For example, the scratch partition could be one of the disk partitions or a separate memory device within memory device 304.

Memory device 304 may store a variety of EGM data, as described herein, related to an EGM 104A-104X, such as, for example, a variety of configuration data, log data, a serial number of an EGM 104A-104X, and/or more generally, any data which may be deemed relevant to or related in some way to an EGM 104A-104X. For example, in some embodiments, a serial number of an EGM 104A-104X may be persistently or permanently retained in memory device 304 to track a provenance and history of an EGM 104A-104X, such as over the course of time as an EGM 104A-104X is moved from one location to another, including from one location within a single casino to another location within the casino or from one casino to a different casino.

Moreover, as memory device 304 may include a variety of stable, nonvolatile and/or redundant memory devices and device configurations, memory device 304 may store the EGM data, as described above, in a variety of stable and permanent arrangements. For example, EGM data may be securely and permanently stored in NVM. Likewise, EGM data may be securely and permanently stored in a redundant array of disks or disk partitions, either in addition to or alternatively from storage in NVM.

In one embodiment, memory 304 may be configured separate from the EGM controller 306 (e.g., separate from working memory 208 of game controller 202) and may be excluded from EGM reset operations. As such, even if there is a memory clear or memory wipe (e.g., a NVRAM clear, such as in the case of an EGM reset), EGM data stored in memory 304 is not overwritten by the NVRAM clear, and instead persists through such reset operations. Likewise, if a portion of data is lost from a redundant array, the data may be reconstructed, as it will be appreciated, from the redundant data mirrored across stripes of the array. Further, if the redundant array is somehow irreparably damaged, EGM data may still exist intact on a solid-state mass storage device that also houses one or more copies of the EGM data. In some embodiments, EGM configuration data or event data may be stored in the blockchain (e.g., as configuration transactions associated with the unique device ID of the EGM) and, as such, may be read and recovered after an NVRAM clear (e.g., the EGM reading and restoring the latest configuration settings from the blockchain after the NVRAM clear). In some embodiments, the blockchain may be recovered on one node of the blockchain from other participating nodes of the blockchain. Thus, EGM resets and other events that may potentially result in loss of data may not, in the embodiments described herein, actually result in the loss of any EGM data.

In some embodiments, EGM data may also be stored in a blockchain. Generally, a blockchain is a distributed (or non-distributed) database that maintains a continuously-growing list of ordered records, known as blocks. Each block may contain at least a timestamp and a link to the previous block in the chain. The link to the previous block may be a hash of the previous block. A first block may contain an initial data set. The second block may contain a modification to the initial data set. The second block may contain a hashed copy of the first block as well. A third block may contain a modification to the initial data set and a hashed value of the second block (and/or first block) and so on for as many blocks are added to the blockchain. That is, this process of adding blocks continues with each block adding on to the next while containing a hash of the previous blocks in the blockchain.

To ensure the security of the information contained in the blockchain, copies of the blockchain may be distributed across multiple computer devices, known as nodes. These nodes maintain the blockchain, update the blockchain when changes occur, and ensure the stability of the blockchain itself. In some embodiments, nodes may be also used to calculate the hash of the previous blocks (e.g., proof of work protocol). As the blockchain grows, the processing power needed to calculate the hash of the previous blocks grows as well. In these embodiments, the processing of the hash may be distributed over multiple computer devices to improve the speed of processing and/or to not overburden the hashing processor. When a node processes (hashes) a block, that node is known as a miner, where the action of validating and hashing the block is also known as mining. In some embodiments, the blockchain is a permissioned blockchain comprised of trusted nodes, and the blockchain provides no tokenization or rewards for mining, as there may be no need to incentivize participation for the work contributed by the nodes. Further, the processing and energy consumption demands to nodes on the blockchain can be reduced by replacing the proof of work processing with other consensus mechanisms that dictate which node will add the next block to the blockchain, such as proof of stake ("PoS"), tangle, swirlds, delegated proof of stake, proof of selection, one or more delegated block generators, or the like.

In some embodiments, EGM configuration data may be captured and added as transactions to the blockchain. For example, one or more snapshots of EGM data may be captured and stored as record(s) or transaction(s) in the blockchain, where each snapshot represents current EGM data at the time the snapshot was taken. Such snapshot data of the EGM may include an EGM serial number, log data, such as when and by whom an EGM 104A-104X was last accessed, game configuration data or game play data, such as one or more game titles stored on an EGM 104A-104X, meter data, as described herein, and the like. In some embodiments, blockchain data may be stored in a single node architecture, where an EGM 104A-104X functions as a self-contained block generator and storage system (see FIG. 5 below for a single node or single EGM architecture that generates a validated "consensus" of EGM data based upon one or more stored copies of EGM data and, in at least some embodiments, adds the validated EGM data to blocks of a blockchain). In other embodiments, EGMs 104A-104X may, as described above, store and share blockchain data over a shared peer-to-peer ("P2P") network in a more traditional multi-node blockchain architecture (e.g., with other EGMs 104 or other electronic gaming devices, support servers, or the like, participating in the blockchain). In some embodiments, a single EGM 104 may execute multiple nodes of the blockchain (e.g., storing separate, independent copies of the blockchain stored on separate memory partitions, such as a scratch partition).

During a recovery operation, a most recent copy of a stored blockchain may be accessed by an EGM 104A-104X during a startup or boot sequence, in response to a request, such as by a reader device 402 (described below) for EGM data, in response to or during reconfiguration of the EGM 104A-104X, and the like. To illustrate, reconfiguration may occur in the event of a RAM clear, a power outage or another event that causes the EGM 104A-104X to be reinitialized or reset. More particularly, a RAM clear may be performed when installing a new game on an EGM 104A-104X, to clear out the old game data, or due to some type of critical EGM or game failure. As described in additional detail herein, following a RAM clear, it may be desirable to restore one or more cabinet or game meters to a last known state. In some cases, although meters may often be reset to zero when changing an EGM 104A-104X to present a new or different game, in some cases, it may be desirable to restore one or more of the game meters as well. Thus, in a situation where an EGM 104A-104X experiences a fault requiring a RAM clear to recover or resolve, it may be desirable to restore one or more of the game and/or cabinet meters to the last known "good" (i.e., non-fault) state. A blockchain containing meter data, as described herein, may be used to restore one or more game and/or credit meters to a desired state. Further, as described herein, a casino operator may communicate with an EGM 104A-104X in the field using a reader device 402 to obtain an EGM state, such as any meter data, including, for example, a credit meter value, a game title, and/or any other desired EGM data.

In some embodiments, EGM meter data captured during game play at the EGM may be recorded as transactions in the blockchain. For example, the EGM may generate a meter transaction upon occurrences of, for example, coin-in/coin-out events (e.g., wagers placed during each round of play, wager results of each game round), ticket events (e.g., ticket redemption, ticket issuance), cash in events (e.g., inserting cash), digital wallet transfers, or the like, feature game activations, jackpot win events, or the like. In conventional systems, such meter data is typically erased as part of a RAM clear. Here, any or all of these events may be memorialized in the blockchain and preserved through RAM clears via the blockchain stored in the memory 304 or otherwise re-synchronized from other nodes in the blockchain (e.g., after a RAM clear). In some embodiments, the memory 304 may include multiple partitions, some of which may be designated for reset during a RAM clear, others of which may persist through a RAM clear. For example, the EGM may include a persistent partition (e.g., a scratch partition) storing a copy of the blockchain that persists through RAM clear events and, as such, may be accessed after the reset event (e.g., to recover meter data or other EGM configuration data, event data, or the like). After such a reset event, the EGM may recover any meter data from the blockchain, thereby restoring at least a portion of the device state prior to reset. In some embodiments, other local blockchain nodes may restore local copies of the blockchain after reset events from the blockchain copy on the persistent partition.

In some embodiments, EGM log data of the EGM may be recorded as transactions in the blockchain. For example, the EGM may automatically or manually log various types of maintenance events performed on the EGM, such as cabinet access events, maintenance operations performed by a technician, automatic maintenance routines executed by the EGM, operating system or software logs, software- or hardware-based events experienced by the EGM, network connectivity events, or the like. In conventional systems, some such log data is typically manually recorded at the EGM (e.g., written by a technician in a machine entry authorization log ("MEAL") book internal to the EGM). Here, any or all of this log data may be automatically captured and memorialized in the blockchain, either by the EGM itself or by a support server participating in the blockchain. For example, the EGM may include sensors for various internal and external doors and may sense and record door open events for the various doors as transactions in the blockchain, such as for drops (e.g., removing the bill validator canister or coin drop bucket to, e.g., collect its contents). In some embodiments, software or hardware-related events may be logged, such as, for example, power cycles, voltage faults, memory errors, printer jams, stacker full, meter runaway, and other sensor-monitored cabinet faults or the like. In some embodiments, software update events such as firmware changes to hardware devices (e.g., bill acceptors, touch screens, ticket printers, and the like) may be recorded as transactions in the blockchain. In some embodiments, configuration change events (e.g., changes to communication protocols, polling address, large win limits, or the like) may be recorded as transactions in the blockchain. In some embodiments, some events may be remotely triggered on the EGM (e.g., software changes or updates, changing pay tables, adding or deleting games, changing the maximum bet amounts, and the like) and may be recorded as transactions in the blockchain by the EGM, by the remote device, or both.

The most recently added transaction of a particular type may represent a last known (and therefore most current) configuration of the EGM 104A-104X, which may therefore be used to bring the EGM 104A-104X back to its last known state, including, for example, a state of one or more credit meters, one or more game titles being presented, other configuration data, etc. For example, the most current log data may be loaded or reloaded from the blockchain, whereby it may be determined, for example, the operations recently and/or previously performed with respect to the EGM 104A-104X, including timestamped data of persons accessing the EGM 104A-104X, and other relevant log data. After a reset event, the EGM 104A-104X may search the blockchain for a snapshot transaction that includes prior configuration settings of the EGM (e.g., for the most recent snapshot of that EGM, based on unique device ID and transaction time) and may reconfigure one or more aspects of the EGM based on the prior configuration settings. In some embodiments, the EGM 104A-104X may identify any or all snapshot transactions associated with the EGM 104A-104X from the blockchain (e.g., snapshots taken at different times through the history of the EGM) and may display each of the snapshots and allow a user (e.g., a service technician) to choose which snapshot to use for reconfiguration.

The blockchain transactions may include any EGM data, as described herein, and, in some embodiments, may represent a most recent or last in time version of the EGM data associated with the EGM 104A-104X (and stored in memory device 304). Moreover, depending upon the use, as described above, the data contained in the block may be provided to a casino operator via wireless transmission to a reader device 402, to the processor 304 of the EGM 104A-104X itself for configuration, reconfiguration, or initialization operations, and/or to any other device or system, including the EGM 104A-104X itself, which may require or request, with appropriate permissions, the EGM data.

In some embodiments, prior versions of some types of EGM configuration data may be accessed during a roll back operation. For example, a roll back operation may be initiated that resets selected EGM configuration data to a prior version. Since the blockchain stores various snapshots of EGM configuration data (e.g., at various points in time), the roll back operation may include inspecting the various recent snapshots of EGM configuration data and loading configuration data from any of the snapshots captured in the blockchain for that EGM. The EGM may provide a support interface that displays recent configuration data snapshots to a user (e.g., a service technician) and may allow the user to select which snapshot to use for the roll back operation. As such, roll back operations may be used to return an EGM 104A-104X to a previous configuration or state. Such operations may, in addition, be useful where, for example, a most recent configuration or state is for some reason undesirable and/or to review a history of an EGM 104A-104X.

Processor 306 may include any suitable controller, microcontroller, computer processor unit (CPU), arithmetic logic unit (ALU), game controller 202, and the like. For example, in at least one embodiment, processor 306 is included in or comprises game controller 202. Memory device 304 may, in addition, store instructions which may be executed by processor 306. As described herein, processor 306 may execute the instructions stored on memory device 304 to perform and implement the processes described herein.

Transmitter 308 may include any suitable transmitter, receiver, or transmitter-receiver (i.e., transceiver), such as any beacon, antenna or plurality of antennas configured to send and/or receive data. In the example embodiment, transmitter 308 is only configured for one-way transmission of data, such as from within cabinet 302 to an authorized external receiver device, and is not configured to receive wireless data (e.g., to prevent unwanted communications into cabinet 302). In another embodiment, transmitter 308 is a transceiver and may both send and receive data.

In some embodiments, transmitter 308 may be configured for radio frequency (RF) communications. For example, in some cases, transmitter 308 may include an RF identifier (RFID) device, which may transmit and RF signal to an RF reader (as described herein) external of cabinet 302. Likewise, transmitter 308 may simply include a radio transmitter or radio transceiver. In other embodiments, transmitter 308 may include an optical transmitter, such as a laser transmitter, a BLUETOOTH transmitter, a WIFI transmitter, and/or any other short or medium range transmitter or near-field communication device. In one example embodiment, the EGM uses a BLUETOOTH beacon such as those made commercially available by Radius Networks, Inc. (headquartered in Washington, D.C.) (e.g., "RadBeacon USB").

In the example embodiment, the transmitter 308 is configured to broadcast a "broadcast ID" (e.g., a unique device ID of the EGM 302 or a unique ID of the transmitter itself). The broadcast ID may be hardcoded into the transmitter (e.g., to protect against spoofing attempts) or may contain a unique ID to self-validate. In some embodiments, the transmitter is configured to transmit other device data, such as model, manufacturer, manufacture date, or the like. As such, a nearby receiver (not shown in FIG. 3) may wirelessly receive and read the unique device ID ("UID") of the EGM 302. In some embodiments, the receiver may use the unique device ID or transmitter ID to look up additional information about the EGM 302 (e.g., from a remote database). In some embodiments, the transmitter may broadcast diagnostic information or events about the state of the EGM 302 (e.g., power state, current error conditions, settings, or the like) or accounting information (e.g., current meter information). In some embodiments, the transmitter 308 is configured to transmit blockchain data (e.g., blockchain transaction data), such as the most recent block, the most recent blockchain transactions associated with the EGM 302, or the entire blockchain (e.g., allowing access to the history of event data associated with the EGM 302). Further, in the example embodiment, communications are restricted to one-way communication from processor 306 to transmitter 308 (e.g., to prevent wireless ingress into the EGM).

Figure 4:
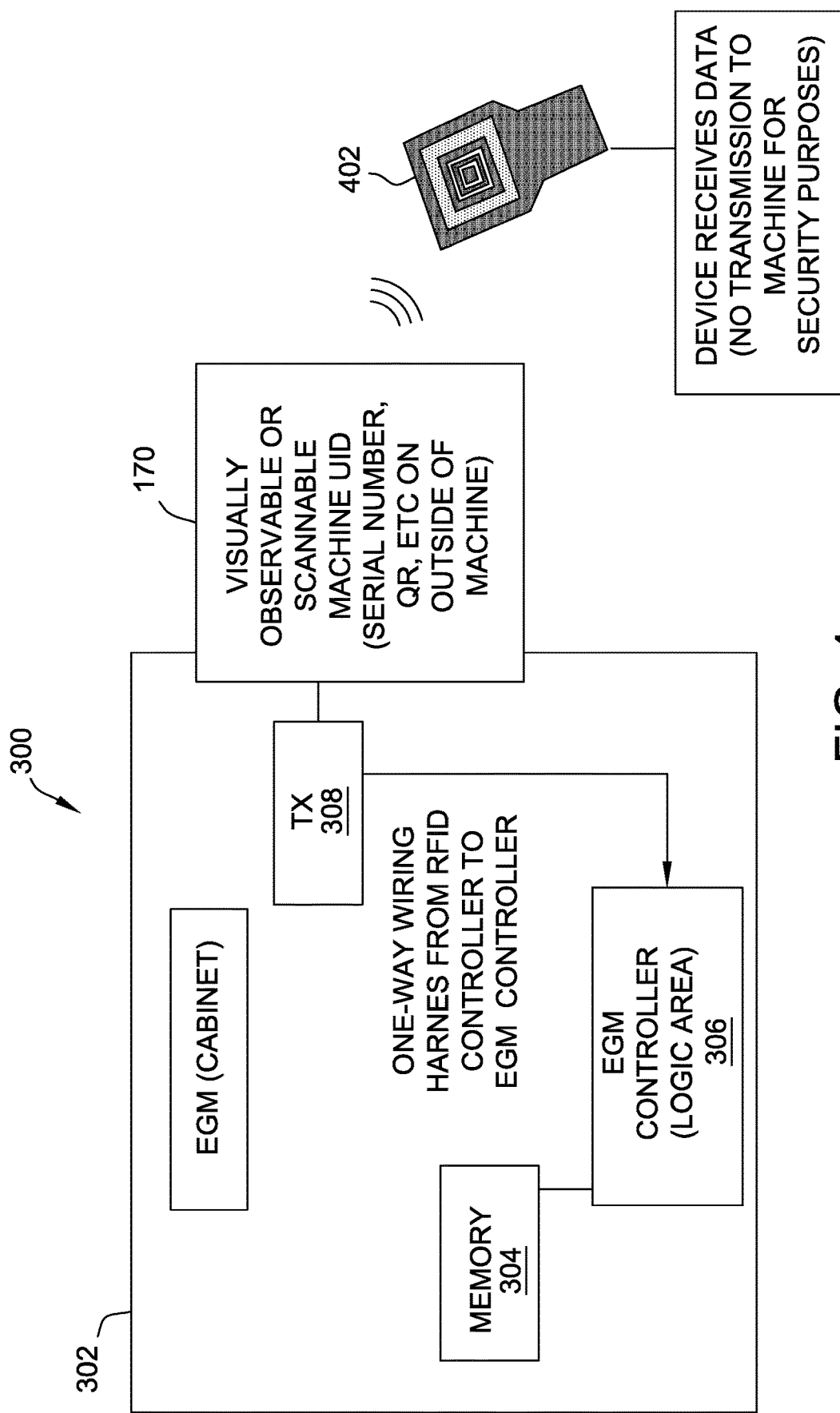
FIG. 4 is a block diagram of the system shown in FIG. 3 communicating the permanently stored EGM data to an external reader device.

FIG. 4 is a block diagram of system 300 (shown in FIG. 3) including an external reader device 402, in which system 300 communicates the persistently stored EGM data to external reader device 402. In the example embodiment, external reader device 402 may include a wireless communication device configured to receive data wirelessly from the transmitter 308 of the EGM 302, such as, for example, a BLUETOOTH-enabled device or an RF receive antenna (RF receiver) operating on, or capable of operation on, a same frequency as transmitter 308. Specifically, in at least one embodiment, reader device 402 may include an RFID reader (e.g., a handheld RFID reader) capable of receiving a data signal on a frequency, or within a frequency range, of transmitter 308. Likewise, in some embodiments, reader device 402 may include an optical reader, a BLUETOOTH receiver, a WIFI device, and the like.

In some embodiments, reader device 402 may also include a wireless transmitter capable of communicating data to a receiver or transceiver within cabinet 302 of an EGM 104A-104X. For example, in at least some embodiments, reader device 402 may be capable of transmitting handshake data or other initialization data. Likewise, in at least some embodiments, reader device 402 may transmit a request to processor 306 for a particular piece or portion of EGM data, such as, for example, one or more game titles loaded on an EGM 104A-104X, an EGM serial number, and the like. However, as described herein, in other embodiments, system 300 may only permit one-way communications between transmitter 308 and reader device 402 to prevent unauthorized entry (e.g., "hacking") of an EGM 104A-104X.

Reader device 402 may also be capable of decrypting data received from transmitter 308. For example, the EGM 302 may encrypt transmitted data using a public/private key pair associated with the EGM 302, and may share the public key with the reader device 402. Reader device 402 may include a processor that executes encryption operations stored on a memory, also within reader device 402, which when executed, enable the processor to apply a decryption algorithm to decrypt data received from transmitter 308 (e.g., using the public key of the EGM).

In some embodiments, EGM data received by reader device 402 may be communicated (e.g., over a wireless network) to one or more server systems, such as any of server systems 106-114 and/or any other server or backend data processing system. As a result, EGM data collected by reader device 402 may also be analyzed by any of server systems 106-114 to perform a variety of operations, such as tracking a location, over time, of an EGM 104A-104X, tracking configurations of an EGM 104A-104X over time, analyzing and tracking technicians or casino operators who have accessed an EGM 104A-104X and the operations performed during each access of an EGM 104A-104X, and the like. Similarly, any of a variety of related reports may be generated and provided, such as in summary format, to a user. In some embodiments, some of the EGM data may be retrieved from a blockchain local to the EGM 302 and transmitted to the reader device 402. In some embodiments, the EGM data received by reader device 402 and transmitted to the server system 106-114 may be added to a blockchain in which the server system participates. For example, after receiving a configuration snapshot of the EGM 302, the reader device 402 may transmit the configuration snapshot to the server system (and perhaps other data such as the UID of the EGM 302, a timestamp of the snapshot, or the like), and the server system may memorialize the configuration snapshot in the system blockchain upon receipt. In some embodiments, the server system 106-114 may pull EGM data from the EGM 302 (e.g., through another network connection, such as a local area network). For example, after receiving the UID of the EGM 302 from the reader device 402, the server system may identify the EGM 302 and retrieve EGM data from the EGM 302 (e.g., requesting particular data from a client application on the EGM 302, such as current or historical meter data, operations log data, data stored in the local blockchain, or the like).

Accordingly, in operation, EGM data may be easily obtained and tracked within a casino, even, as described above, where the casino may be dimly lit and a traditional "license plate" 170 may be difficult to discern and/or access.

For example, although an EGM 104A-104X may, in the embodiments described herein, include license plate 170 stamped with a variety of EGM data, a casino technician may more easily access EGM data stamped on the plate 170, as well as a great variety of other EGM data, as described above, by placing reader device 402 in proximity to cabinet 302, whereupon reader device 402 may receive a data signal from transmitter 308 that includes some, or all, of the EGM data stored in memory device 304, such as the unique device ID of the EGM 302 (e.g., in lieu of scanning the license plate 170).

As a result, when reader device 402 is used to receive data stored in memory device 304, any EGM data stored in memory device 304 can be downloaded without opening or visually inspecting a cabinet of the EGM 104A-104X. For instance, as described herein, many conventional approaches require physically opening a cabinet of an EGM 104A-104X to retrieve a physical or handwritten log book. Likewise, conventional approaches often frequently require manual or visual inspection of an externally mounted (often difficult to see) license plate. Thus, using reader device 402, a casino operator may obtain any of a variety of data, including configuration data, log data, maintenance event data, meter data, blockchain transaction data, UID or serial number of an EGM 104A-104X, and the like, without resorting to physical or visual inspection of an EGM 104A-104X. Such historical data being stored in the blockchain enhances data security and confidence in the historical data due to, for example, the encryption and consensus protocols provided by blockchain. Moving MEAL book data into the blockchain and automating aspects of event detection and logging avoids numerous problems with physical log books such as, for example, physical access, mistakes in entries, and detection of logged events.

Some embodiments may, in addition, permit exclusion of a physical license plate 170 from an external surface of an EGM 104A-104X. Further, in the event that a license plate 170 is removed or separated from an EGM 104A-104X, the embodiments described herein permit retrieval of EGM data from memory device 304 which, as described above, may be configured to permanently and redundantly store the EGM data, even in the event of an EGM or factory reset.

In some embodiments, the system 300 may log any or all events or operations performed by the reader device 402 on the blockchain. For example, upon scanning and reading the unique device ID of the EGM 302 from the transmitter 308, the reader device 402 may wirelessly transmit a scan log event to a system server, such as the casino management system server 114 or other on-site server or off-site server (e.g., a cloud-based server), indicating that the reader device 402 has just scanned the EGM 302. The casino management system server 114 may participate in the blockchain and, as such, may create and transmit an EGM log event into the blockchain (e.g., identifying the unique ID of the EGM 302, a unique ID of the reader device 402, a log event type of "scan event", and possibly other data such as a user ID of an operations technician, a timestamp of the event, or the like). Likewise, any such operations or events performed by the reader device 402 may similarly be uploaded to the blockchain, thereby consolidating such log data with EGM log data directly added to the blockchain by the EGM 302 and allowing a richer history of maintenance activities performed on the EGM 302. In some embodiments, the casino management system server 114 may provide event data associated with the EGM 302 to the reader device 402 (e.g., as read from the blockchain), thereby allowing the reader device 402 access to historical data for that EGM 302. In some embodiments, a system server such as the casino management system server 114 may access historical information (e.g., from the blockchain), for the EGM 302 or other gaming devices 104, and may use that data, for example, in machine learning algorithms to gain actionable insights.

Figure 5:
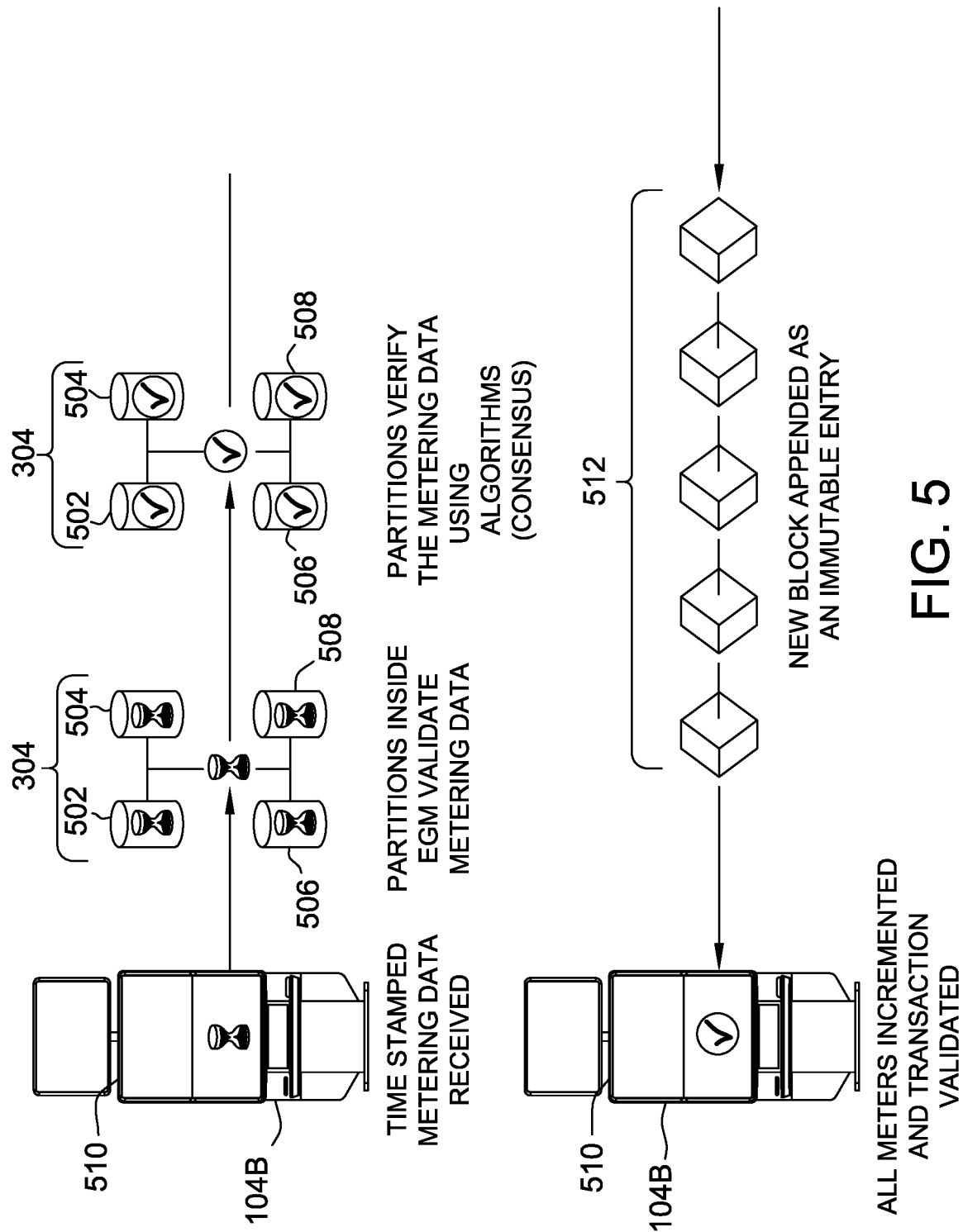
FIG. 5 is a block diagram illustrating a plurality of memory partitions within an EGM for permanently or persistently storing EGM data and generating a validated consensus of EGM data based upon a plurality of copies of the stored EGM data.

FIG. 5 is a block diagram illustrating a plurality of memory devices or memory partitions within an EGM 104B for permanently or persistently storing EGM data and generating a validated consensus of the EGM data based upon a plurality of copies of the stored EGM data. Specifically, memory device 304 may be divided into multiple partitions (or consist of multiple drives). Accordingly, a first memory partition 502, a second memory partition 504, a third memory partition 506, and a fourth memory partition 508 are shown, each of which may exist on a single drive (e.g., as a partition) or represent a drive unto itself organized, for example, in a redundant array and/or simply in a networked or interconnected hard disk architecture. For example, in one embodiment, the first partition 502 may be a primary drive dedicated to an operating system image of the EGM 104B, the second partition 504 may be dedicated to electronic game components (e.g., game executables, game assets, and the like), the third partition 506 may be dedicated to blockchain (e.g., to a blockchain client, for storage and management of the blockchain 512), and the fourth partition 508 may be dedicated as a scratch partition and, in some embodiments, may act as a second independent node of the blockchain (e.g., storing a second copy of the blockchain local to the EGM 104B). Some partitions may be designated to be cleared during a RAM clear or reset event, where other partitions may persist through such events (e.g., to preserve a local copy of the blockchain). In some embodiments, some partitions 502-508 may be allocated to distinct virtual machines (VMs) and a hypervisor (not shown), any or all of which may independently participate in the blockchain 512.

In the example embodiment, time stamped meter data 510 is received, such as by processor 306 (not shown in FIG. 5), and a copy of the time stamped meter data 510 is stored, by the processor 306, on at least one partition 502-508. For example, a copy of the time stamped meter data 510 may be stored to each partition 502-508. In other embodiments, fewer than four copies of the time stamped meter data 510 may be stored to the partitions 502-508. For example, in one embodiment, only two copies of the time stamped meter data 510 are stored to two of the four partitions 502-508. Meter data 510 may include, for example, coin-in/coin-out events (e.g., wagers placed during each round of play, wager results of each game round), ticket events (e.g., ticket redemption, ticket issuance), cash in events (e.g., inserting cash), digital wallet or player account transfers, or the like, feature game activations, jackpot totals, credit meter totals, jackpot win events, progressive jackpot increments, or the like. The EGM 104 may define transaction types for the various types of meter data transactions that may be stored or added to the blockchain 512. For example, meter data transaction types may include coin-in events (e.g., wager amount placed during a round of game play), coin-out events (e.g., amounts awarded for a round of game play), ticket creation events (e.g., tickets printed upon the player cashing out of a gaming session), ticket redemption events or cash input events (e.g., tickets or cash currency input and scanned to increase the player's credit balance on the EGM 104), account transfers (e.g., transfer transactions moving credit from the player's accounts to the EGM 104 to increase the credit balance). In addition to a transaction type, the blockchain transactions for meter data may include a transaction value (e.g., coin-in value, coin-out value, ticket value, transfer value, or the like), the unique ID of the EGM 104, a timestamp of the event, an account ID or account number (e.g., unique player loyalty ID, player account number, digital wallet account identifier), or the like.

One reason for storing the time stamped meter data 510 to more than a single partition 502-510 is to ensure redundancy of the time stamped meter data 510, such as, in the instance that one or more partitions experience data loss or malfunction. Another reason for storing the time stamped meter data 510 to multiple partitions 502-508 is to facilitate data validation, which may result, as described in additional detail below, in generation of a "consensus," where, as used herein, a "consensus" is a validated copy of the time stamped meter data 510 stored on at least two partitions 502-508. Accordingly, in at least one embodiment, the time stamped meter data 510 may be validated by comparing each copy of the time stamped meter data 510 stored on two or more partitions 502-508 to one or more other copies of the time stamped meter data. If the copies match, the time stamped meter data 510 may be validated, and one of the validated copies (or more than a single copy) designated as a "consensus" version.

In another embodiment, no consensus version is generated; rather, if the comparison yields a consensus that the time stamped meter data 510 is valid, processor 306 may store a flag or indication in memory device 304 to reflect that the time stamped meter data 510 has been validated. Further, in various embodiments, any suitable comparison methodology may be employed, such as, for example, but not limited to, performing a checksum algorithm on time stamped meter data 510, and the like. In other words, a variety of algorithms known in the art may be used to determine or generate a consensus.

In some embodiments, a validated or consensus version of time stamped meter data 510 may, in addition or alternatively, and as described above, be added to a blockchain 512 (e.g., as numerous individual transactions) and stored for later retrieval, such as, for example, in response to a system reset or re-initialization operation, where it may be desirable to determine a last known state of one or more hardware meters, such as one or more credit meters, one or more jackpot meters, and the like. The blockchain 512 may be updated periodically (e.g., once per wager, once every minute, once every five minutes, once every ten minutes, and so on) with updated consensus version of time stamped meter data 510 to ensure that the blockchain 512 contains accurate and up to date copies of all meter data. In some embodiments, transactions from the blockchain 512 may be stored on a local blockchain and/or a system blockchain, and replicated between such, in a two-tier blockchain network architecture as shown and described in U.S. Provisional Patent Application Ser. No. 62/855,429, the entire contents and disclosure of which is hereby incorporated by reference in its entirety.

Although the foregoing discussion relates mainly to time stamped meter data 510, it will be appreciated that any EGM data, as described herein, may be stored over multiple partitions 502-508 or drives and validated to create a consensus or consensus version of the EGM data in the same manner. Likewise, validated or consensus versions of any of the EGM data described herein may be stored in blockchain format.

Figure 6:
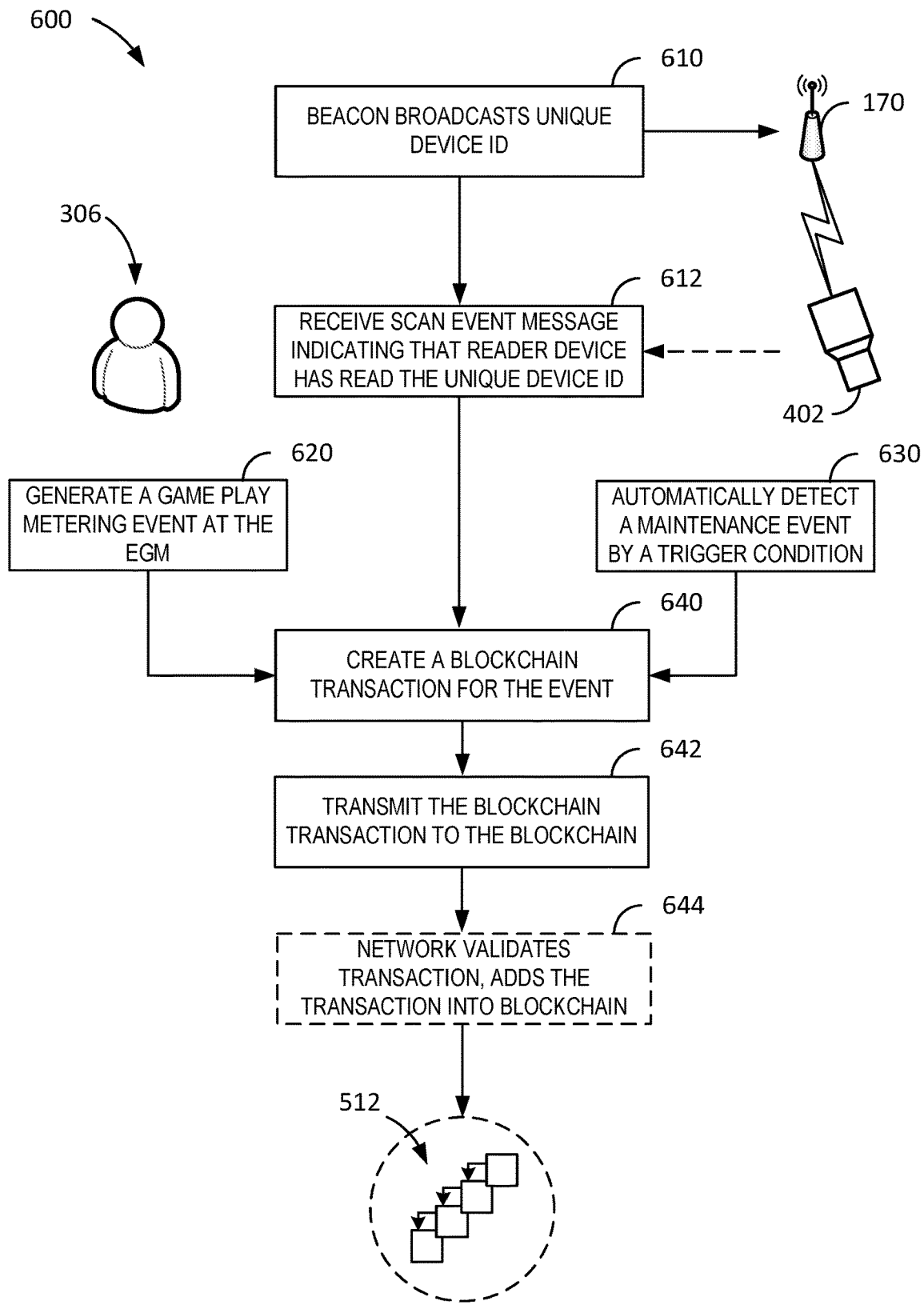
FIG. 6 is a flowchart of an example computer-implemented method for recording various gaming machine event data for electronic gaming devices in a blockchain.

FIG. 6 is a flowchart of an example computer-implemented method 600 for recording various gaming machine event data for electronic gaming devices 104 in a blockchain 512. In some embodiments, the method 600 is performed by the gaming device 104B, which participates as a node in the blockchain 512 with other gaming devices 104. In the example embodiment, the method 600 includes wirelessly broadcasting a unique device ID (e.g., via beacon 170) at operation 610. In some embodiments, operation 610 additionally or alternatively includes transmitting EGM data such as meter data, log data, maintenance event data, configuration data, or blockchain transaction data (e.g., the most recent transactions from the blockchain involving the scanned EGM). During a maintenance event, for example, a service technician (not shown) or other operator uses the reader device 402 to scan and identify (e.g., read) the broadcast of the unique device ID. In the example embodiment, the reader device 402 is in networked communication with a system support server (e.g., casino management system server 114) that can identify and communicate with the electronic gaming device 104B based on the unique device ID identified by the reader device 402. More specifically, when the reader device 402 scans and reads the unique device ID of the gaming device 104B, the reader device 402 transmits a scan event message to the system support server, and the system support server is configured to identify and transmit the scan event message to the particular gaming device 104B associated with the unique device ID. The scan event message may include a unique device ID of the reader device 402, a timestamp collected at the time of the scan, or other information associated with the scan (e.g., other data read by the scan, location information captured by the reader device 402, user ID of the service technician performing the scan, or the like). In other embodiments, the reader device 402 may transmit the scan event message directly to the gaming device 104B. At operation 612, the gaming device 104B receives the scan event message, indicating that the reader device 402 has read the unique device ID of the gaming machine 104B.

In some embodiments, the gaming device 104B may additionally or alternatively capture metering data of the gaming device 104B. For example, as the player 306 participates in game play at the gaming device 104B, the gaming device 104B may generate game play metering events with associated event data at operation 620 (e.g., wager amounts, win amounts, player credit balance, total amount of money wagered on the gaming machine, total amount of money deposited, total amount of money withdrawn, total amount of winnings, and so forth). Method 600 may record such event data in the blockchain 512.

In some embodiments, the gaming device 104B may additionally or alternatively automatically detect a maintenance event performed on the gaming device 104B. For example, the gaming device 104B may register a maintenance event by sensor (e.g., door open, temperature fault, tilt sensor, impact sensor, or the like), via software errors or events (e.g., system log alerts of local operating system or program components, routine checks), or via software maintenance operation (e.g., local maintenance procedure initiated by the service technician, remote maintenance operation initiated by system support server). Each event may include event data such as, for example, unique device ID of the gaming device 104B, event timestamp, event type, and other event data particular to the source and nature of the event (e.g., sensor tripped, temperature reading, operating system error information, routine diagnostic data collected, maintenance procedure initiated, and the like). Method 600 may record such event data in the blockchain 512.

At operation 640, the gaming device 104B creates a blockchain transaction for the event (e.g., scan event, metering event, maintenance event). The gaming device 104B transmits the blockchain transaction into the blockchain network (e.g., as a broadcast to the participating nodes of blockchain 512) at operation 642. In some embodiments, the server may participate in the blockchain and may create and transmit the blockchain transaction into the blockchain network (e.g., in lieu of the gaming device 104B). At operation 644, a blocking node of the blockchain network validates the transaction, along with perhaps other transactions, and adds the blockchain transaction to the blockchain 512 as a part of the next block in that blockchain 512. As such, the gaming device 104B, and optionally the supporting server, receive updates to their local copies of the blockchain through the blockchain network.

Thus, the systems and methods described herein include a secure digital storage mechanism for EGM data, which may facilitate wireless transmission of EGM data from secure digital media enclosed within a cabinet of an EGM to a reader device disposed outside the cabinet and arranged to communicate with and receive the EGM data from a processor and transmitter also secured within the cabinet. The EGM data may, more particularly, be permanently or persistently stored in any of a variety of solid-state memories, hard disks, and/or redundant arrays, such that the EGM data is not easily removed from the EGM, and such that the EGM data can be wirelessly and electronically obtained from an EGM without the necessity of manually reading data printed on a physical license plate of the EGM or within a log book of the EGM (such as a log book stored within a cabinet of the EGM and handwritten on when the EGM is accessed). Further, the EGM data may be stored in blockchain format to capture snapshots of the EGM data in time, and processed on one or more backend or network devices (e.g., server systems) to perform a variety of EGM tracking and analysis activities.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:
   at least one memory device comprising plurality of memory partitions;
   at least one processor in communication with the at least one memory device and a blockchain network, wherein the at least one processor is configured to:
      receive data associated with play of an electronic game at the electronic gaming device, the data comprising at least one of a transaction type or a transaction value;
      cause a first copy of the data to be stored in a first memory partition of the plurality of memory partitions;
      cause a second copy of the data to be stored in a second memory partition of the plurality of memory partitions;
      validate the data by determining consensus between the first copy of the data stored in the first memory partition and the second copy of the data stored in the second memory partition; and
      in response to validating the data, cause the data to be stored in a blockchain in the blockchain network by submitting a blockchain transaction associated with the data to the blockchain network.

2. The electronic gaming device of claim 1, wherein the blockchain transaction comprises the at least one of the transaction type or the transaction value and a timestamp.

3. The electronic gaming device of claim 1, further comprising a wireless transmitter.

4. The electronic gaming device of claim 3, wherein the at least one processor is further configured to:
   detect a scan event, the scan event indicating that a device has received data broadcast by the wireless transmitter; and
   cause a scan event blockchain transaction to be stored in the blockchain network, the scan event blockchain transaction comprising at least one of a device ID of the electronic gaming device, a device ID of the device, or a scan event timestamp.

5. The electronic gaming device of claim 1, wherein the data comprises meter data, and wherein the at least one processor is further configured to:
   cause the first copy of the data in the first memory partition to be erased during a reset event; and
   restore the meter data on the electronic gaming device by accessing the second copy of the data in the second copy of the data in the second memory partition.

6. The electronic gaming device of claim 5, wherein the metering data is associated with one of a coin-in event associated with a wager or a coin-out event.

7. The electronic gaming device of claim 1, wherein the at least one processor is further configured to:
receive second data associated with a maintenance event at the electronic gaming device;
cause a first copy of the second data to be stored in the first memory partition;
cause a second copy of the second data to be stored in the second memory partition;
validate the second data by determining consensus between the first copy of the second data and the second copy of the second data; and
in response to validating the data, cause the second data to be stored in the blockchain by submitting a second blockchain transaction associated with the second data to the blockchain network.

8. The electronic gaming device of claim 1, wherein the at least one processor is further configured to:
parse the blockchain network for a transaction that includes at least one previous configuration setting of the electronic gaming device associated with an aspect of the electronic gaming device; and
based at least in part upon the at least one previous configuration setting, reconfigure the aspect of the electronic gaming device.

9. The electronic gaming device of claim 1, wherein the at least one processor is further configured to:
receive a plurality of transactions from the blockchain network, wherein one or more transactions of the plurality of transactions comprise a respective configuration setting of the electronic gaming device; and
in response to a selection of one of the one or more transactions, cause the respective configuration setting to be applied to the electronic gaming device.

10. The electronic gaming device of claim 9, wherein the one or more transactions further comprise a respective timestamp.

11. At least one non-transitory computer-readable storage medium with instructions stored thereon that, in response to execution by at least one processor, cause the at least one processor to:
receive data associated with play of an electronic game at an electronic gaming device, the data comprising at least one of a transaction type or a transaction value;
cause a first copy of the data to be stored in a first memory partition of a plurality of memory partitions;
cause a second copy of the data to be stored in a second memory partition of the plurality of memory partitions;
validate the data by determining consensus between the first copy of the data stored in the first memory partition and the second copy of the data stored in the second memory partition; and
in response to validating the data, cause the data to be stored in a blockchain in a blockchain network by submitting a blockchain transaction associated with the data to the blockchain network.

12. The at least one non-transitory computer-readable storage medium of claim 11, wherein the instructions further cause the at least one processor to:
detect a scan event, the scan event indicating that a device has received data broadcast by a wireless transmitter of the electronic gaming device; and
cause a scan event blockchain transaction to be stored in the blockchain network, the scan event blockchain transaction comprising at least one of a device ID of the electronic gaming device, a device ID of the device, or a scan event timestamp.

13. The at least one non-transitory computer-readable storage medium of claim 11, wherein the data comprises meter data, and wherein the instructions further cause the at least one processor to:
cause the first copy of the data in the first memory partition to be erased during a reset event; and
restore the meter data on the electronic gaming device by accessing the second copy of the data in the second copy of the data in the second memory partition.

14. The at least one non-transitory computer-readable storage medium of claim 11, wherein the instructions further cause the at least one processor to:
receive second data associated with a maintenance event at the electronic gaming device;
cause a first copy of the second data to be stored in the first memory partition;
cause a second copy of the second data to be stored in the second memory partition;
validate the second data by determining consensus between the first copy of the second data and the second copy of the second data; and
in response to validating the data, cause the second data to be stored in the blockchain by submitting a second blockchain transaction associated with the second data to the blockchain network.

15. The at least one non-transitory computer-readable storage medium of claim 11, wherein the instructions further cause the at least one processor to:
parse the blockchain network for a transaction that includes at least one previous configuration setting of the electronic gaming device associated with an aspect of the electronic gaming device; and
based at least in part upon the at least one previous configuration setting, reconfigure the aspect of the electronic gaming device.

16. The at least one non-transitory computer-readable storage medium of claim 11, wherein the instructions further cause the at least one processor to:
receive a plurality of transactions from the blockchain network, wherein one or more transactions of the plurality of transactions comprise a respective configuration setting of the electronic gaming device; and
in response to a selection of one of the one or more transactions, cause the respective configuration setting to be applied to the electronic gaming device.

17. A method of securely adding data to a blockchain, the method implemented by at least one processor in communication with at least one memory, the method comprising:
receiving the data, wherein the data is associated with play of an electronic game at an electronic gaming device, and wherein the data comprises at least one of a transaction type or a transaction value;
causing a first copy of the data to be stored in a first memory partition of a plurality of memory partitions;
causing a second copy of the data to be stored in a second memory partition of the plurality of memory partitions;
validating the data by determining consensus between the first copy of the data stored in the first memory partition and the second copy of the data stored in the second memory partition; and
in response to validating the data, causing the data to be stored in the blockchain in a blockchain network by submitting a blockchain transaction associated with the data to the blockchain network.

18. The method of claim 17, further comprising:
detecting a scan event, the scan event indicating that a device has received data broadcast by a wireless transmitter of the electronic gaming device; and
causing a scan event blockchain transaction to be stored in the blockchain network, the scan event blockchain transaction comprising at least one of a device ID of the electronic gaming device, a device ID of the device, or a scan event timestamp.

19. The method of claim 17, further comprising:
parsing the blockchain network for a transaction that includes at least one previous configuration setting of the electronic gaming device associated with an aspect of the electronic gaming device; and
based at least in part upon the at least one previous configuration setting, reconfiguring the aspect of the electronic gaming device.

20. The method of claim 17, further comprising:
receiving a plurality of transactions from the blockchain network, wherein one or more transactions of the plurality of transactions comprise a respective configuration setting of the electronic gaming device; and
in response to a selection of one of the one or more transactions, causing the respective configuration setting to be applied to the electronic gaming device.

\* \* \* \* \*